March 14, 1961 J. BOEHM 2,974,594
SPACE VEHICLE ATTITUDE CONTROL SYSTEM
Filed Aug. 14, 1958 5 Sheets-Sheet 1
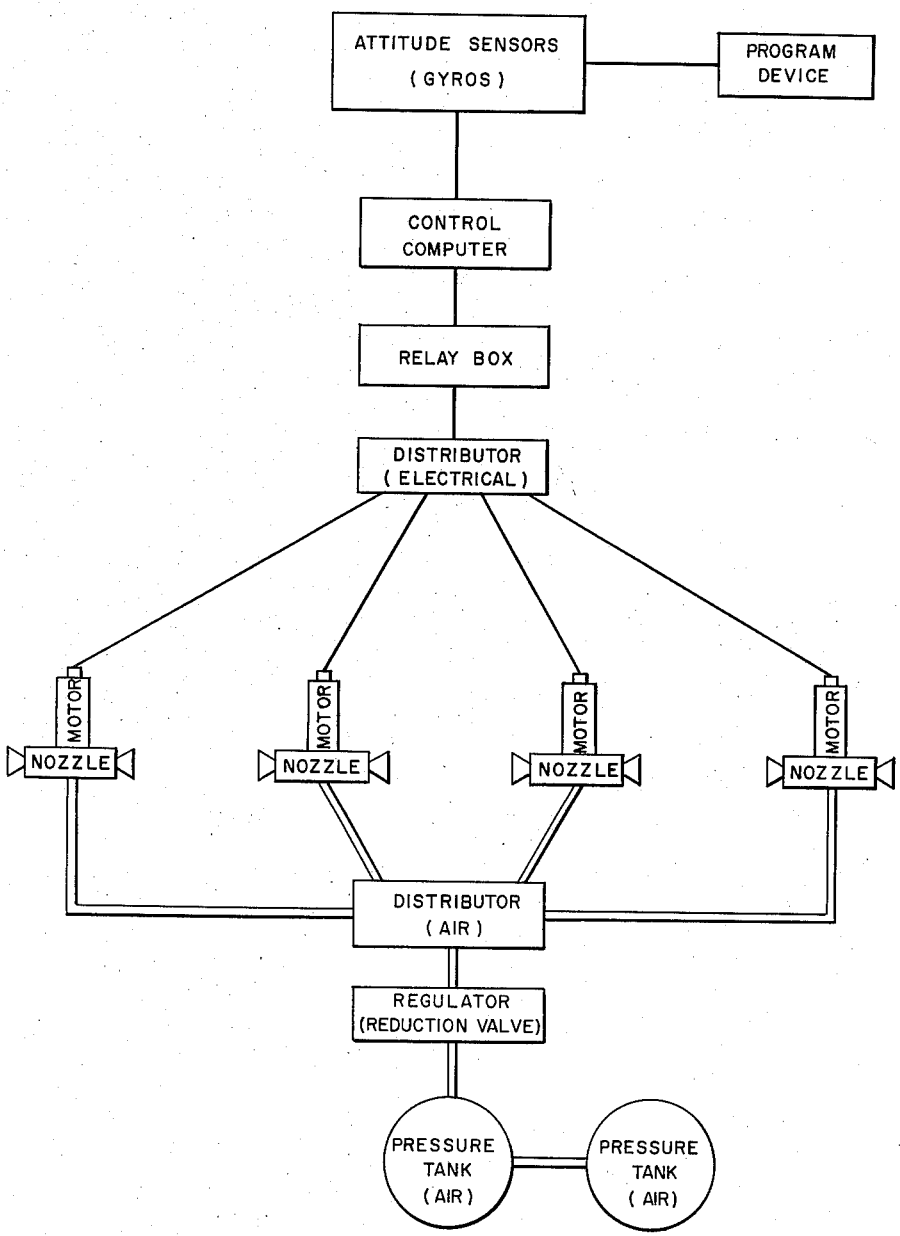
Fig-1-
JOSEF BOEHM,
INVENTOR.
BY S. J. Rotondi,
Victor L. Billings,
A. T. Dupont and
Alvin E. Moore,
ATTORNEYS.

March 14, 1961  J. BOEHM  2,974,594
SPACE VEHICLE ATTITUDE CONTROL SYSTEM
Filed Aug. 14, 1958  5 Sheets-Sheet 2
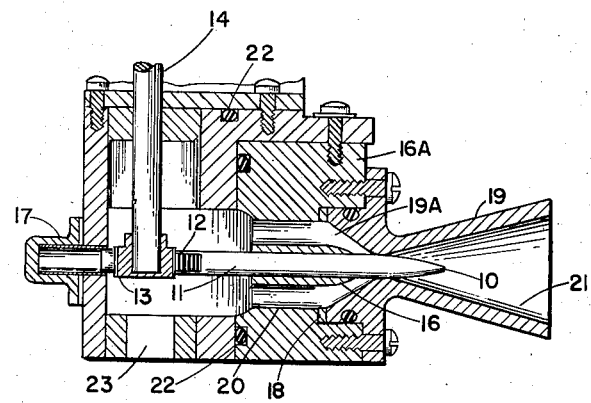
Fig-3-
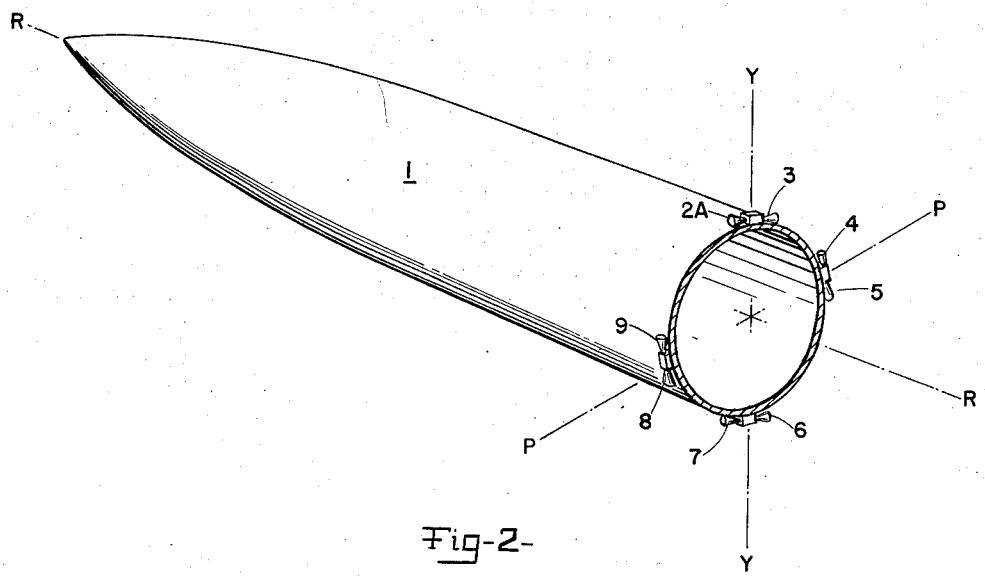
Fig-2-
JOSEF BOEHM,
INVENTOR.
BY S. J. Rotondi,
Victor L. Billings,
A. T. Dupont and
Alvin E. Moore,
ATTORNEYS.

March 14, 1961
J. BOEHM
2,974,594
SPACE VEHICLE ATTITUDE CONTROL SYSTEM
Filed Aug. 14, 1958
5 Sheets-Sheet 3
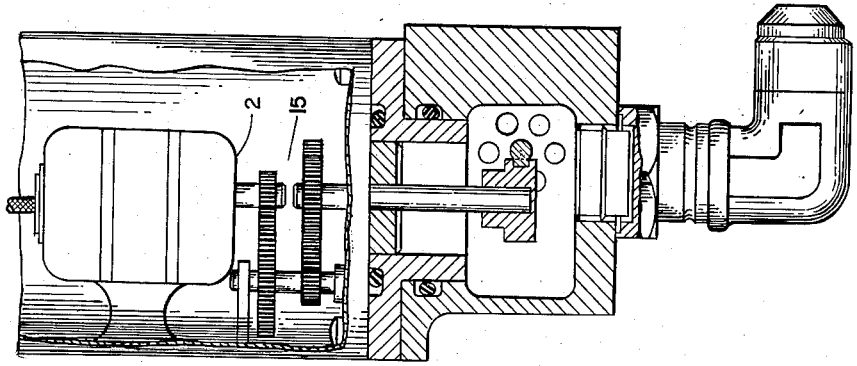
Fig-4-
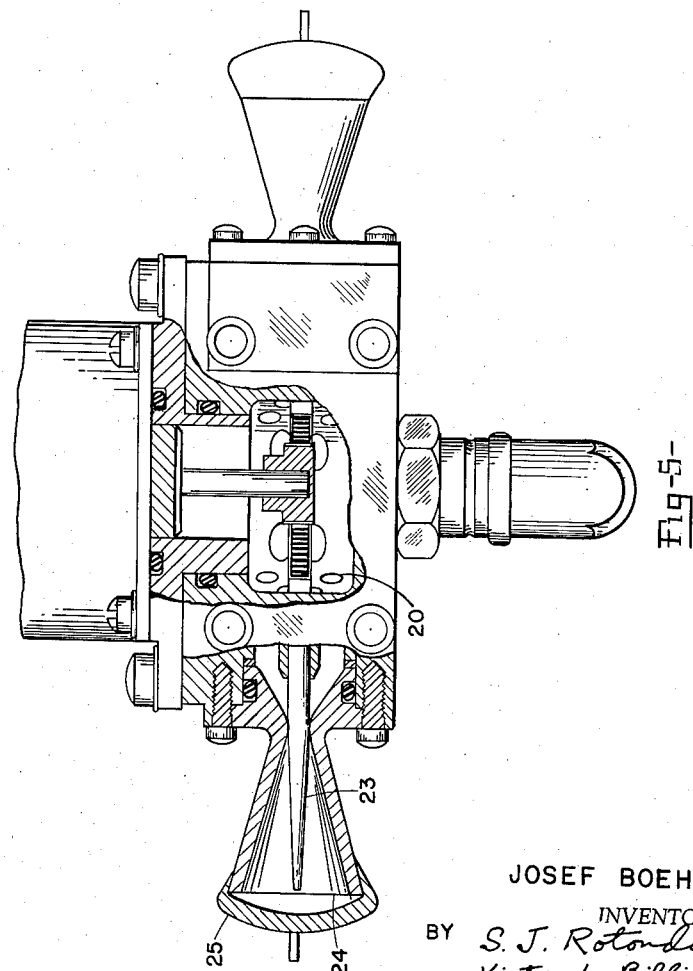
Fig-5-
JOSEF BOEHM,
INVENTOR.
BY S. J. Rotondi,
Victor L. Billings,
A. T. Dupont and
Alvin E. Moore,
ATTORNEYS.

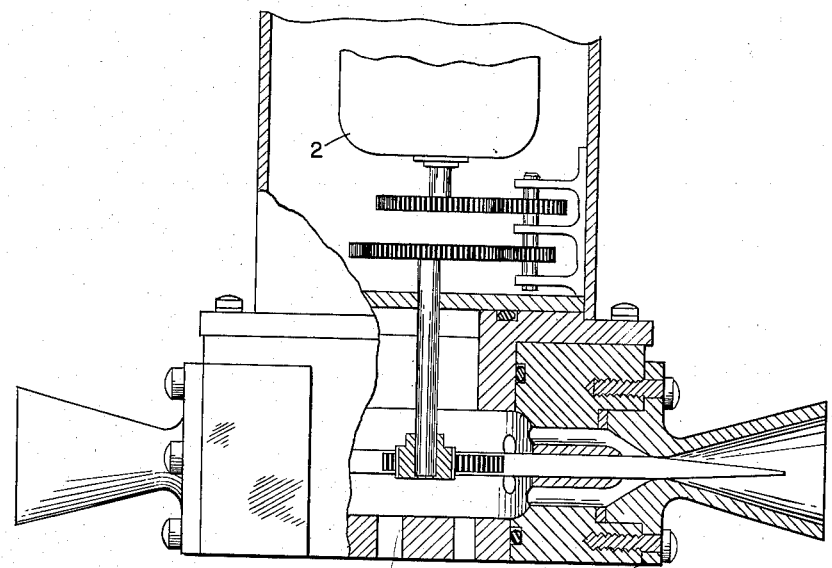
Fig-6-
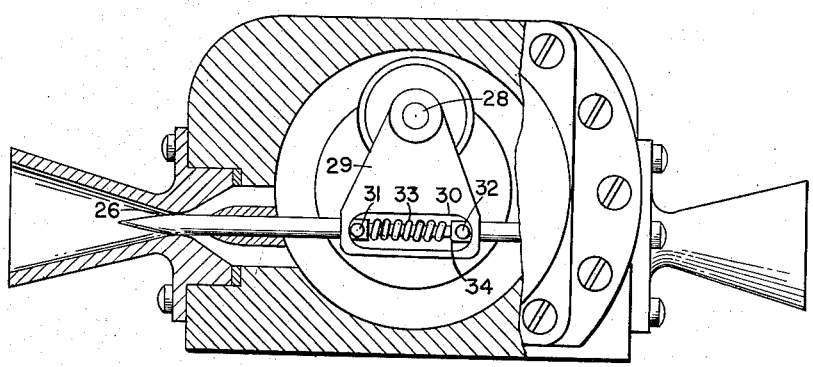
Fig-7-

March 14, 1961 J. BOEHM 2,974,594
SPACE VEHICLE ATTITUDE CONTROL SYSTEM
Filed Aug. 14, 1958 5 Sheets-Sheet 5
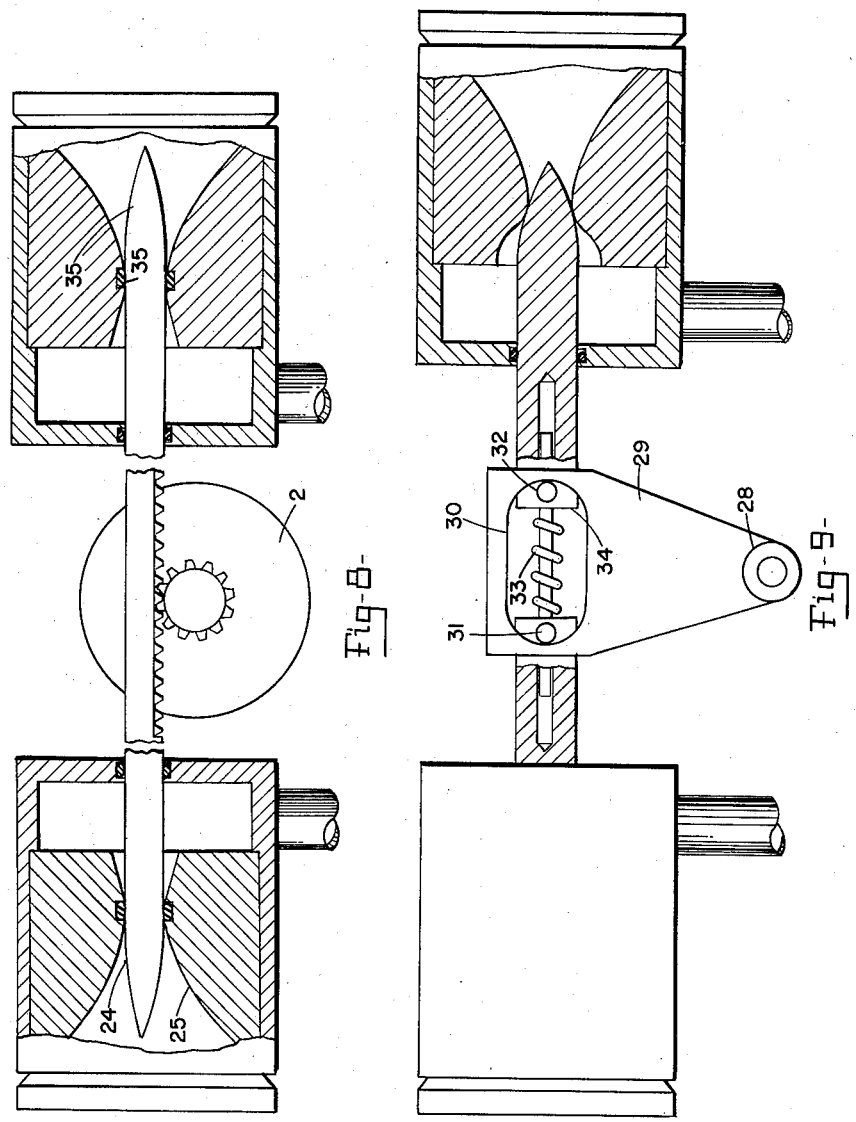
JOSEF BOEHM,
INVENTOR.
BY S. J. Rotondi,
Victor L. Billings,
A. T. Dupont and
Alvin E. Moore,
ATTORNEYS.

United States Patent Office 2,974,594
Patented Mar. 14, 1961

2,974,594

SPACE VEHICLE ATTITUDE CONTROL SYSTEM

Josef Boehm, Huntsville, Ala., assignor to the United States of America as represented by the Secretary of the Army Filed Aug. 14, 1958, Ser. No. 755,116

13 Claims. (Cl. 102—50)

(Granted under Title 35, U.S. Code (1952), sec. 266)

The invention described herein may be manufactured and used by or for the Government for governmental purposes without the payment of royalty thereon.

This invention relates to a space vehicle attitude control system.

One of the currently preferred systems for the control of a spacecraft, satellite or missile, about its roll, pitch and yaw axes, comprises rocket or reaction motors so placed on the vehicle that the operation of one or a set of the motors tends to correct the position of the vehicle after it has deviated from its correct attitude relative to any of said axes. Such a system presents two problems: (1) If the deviation of the vehicle is occurring rapidly it may move from its correct attitude through a large angle in a short time, before the deviation is corrected, thus making necessary a long period of corrective thrust and causing the controlling reaction motor to use too much motive fluid; and (2) unless correction of the deviation is more rapid for a fast deviation than for a slow one, over-correction occurs, with a consequent, immediate counter-correction, so that seesawing or hunting of the vehicle takes place, with consequent instability and troublesome oscillation of objects, fluids and passengers that may be inside the vehicle.

In view of these facts, one of the objects of this invention is to provide an attitude control system which conserves the motive fluid that is utilized in a control rocket motor.

Another object of the invention is to provide an attitude control system in which seesawing or hunting of the vehicle, due to the attitude controls, is reduced to a minimum.

A further object is to provide a control rocket motor which provides linearly proportional thrust, thereby making possible a small torque for a minor correction of attitude and a large torque for a major correction.

An additional object of the invention is to provide a control rocket motor in which the increment of additional corrective thrust per additional unit of time is increased with the duration of operation of the controls.

A further object is to provide a control rocket motor comprising a pair of oppositely directed reaction nozzles, having a common control means and common means for the supply of motive fluid.

The foregoing and other objects of the invention will become more fully apparent from the following detailed description of exemplary structure embodying the invention and from the accompanying drawings, in which:

Fig. 1 is a schematic view of a control system embodying the invention.

Fig. 2 is a perspective view of the invention, embodied, for example, in a satellite or space-traversing nose portion of a multi-stage missile.

Fig. 3 is a view in section along a plane through the longitudinal axis of a single reaction motor nozzle.

Fig. 4 is a detail view, mainly in section, of an attitude-control reaction motor and a control motor and reduction gearing for actuating the reaction motor nozzle.

Fig. 5 is a detail view, mainly in section, of the motor assembly of Fig. 4, as viewed from the left in Fig. 4.

Fig. 6 is a detail view of an attitude-control reaction motor, having a nozzle valve control element of a different design from that of Fig. 4.

Fig. 7 is a detail view, mainly in section, showing a second embodiment of the reaction motor valve control means.

Figs. 8 and 9 are detail views, partly in section, showing the two embodiments of the valve needle operating means that are shown in Figs. 6 and 7, but also showing alternative shapes of valves and nozzles.

With reference to the drawings, and especially to Fig. 1, the invention comprises: attitude sensors which sense any deviation of a space vehicle, relative to its roll, pitch and yaw axes, from its three desired attitudes as determined by its programming device; mechanism influenced by each of the three sensors to actuate a means for controlling an attitude-control reaction motor; and a plurality of reaction motors or pairs of reaction motors that are so located on the space vehicle as to return it to its desired attitudes relative to said three axes. The program device may be one of several known types, comprising a timing device, pre-set instruments and/or radar control means. The attitude sensors may comprise, for instance, gryoscopic or other known-type accelerometers. Deviation between any of the correct datum attitudes (relative to any of the axes of the vehicle, as indicated by the program device) and the actual attitude of the vehicle relative to said axis (as indicated by the sensors) gives rise to a control voltage, which is conducted through an amplifying relay and distributor to one of the attitude-controlling motors. The attitude-control motor then varies the supply of air or other motive fluid to the particular nozzle or pair of nozzles that is positioned to correct the actual attitude into harmony with the theoretical attitude that has been determined by the program device.

Fig. 2 shows a space vehicle 1, which may be a satellite or the pay-load-transporting nose portion of a missile or rocket, having four pairs of rocket motor nozzles: 2A, 3; 4, 5; 6, 7; 8, 9. When the space vehicle 1 deviates in attitude by rotating, for example, about its roll axis R—R in a clockwise direction, control motors 2, shown in Figs. 1, 4, 6 and 8 (which preferably are electric but could be of known hydraulic type), cause a supply of air or other motive fluid to be jetted out through rocket nozzles 3, 5, 7 and 9, thus rolling the vehicle in corrective rotation about the roll axis R—R, in a counter-clockwise direction. In lieu of jets from the four nozzles 3, 5, 7 and 9, a single jet, exerting a torque on the missile about the roll axis, or a group of two or three equidistant jets may be utilized. When a group of such roll-controlling jets is utilized, and one of the motors producing the jets fails, the remaining jet or jets will still function, albeit less efficiently, to correct the attitude of the missile about the roll axis. It is obvious that any or all of the control nozzles may be placed nearer the nose of the vehicle than they are shown in Fig. 2.

When the space vehicle 1 deviates in attitude by rotating about its pitch axis P—P, for example clockwise, as shown in Fig. 2, control motors actuate the nozzle-varying elements of nozzles 5 and 8, correcting the pitch attitude of the vehicle. And when the vehicle departs from its desired attitude in yaw, rotating, for example, in a clockwise direction about its yaw axis Y—Y, as shown in Fig. 2, nozzles 2A and 7 are controlled to provide jets that correct the vehicle's attitude relative to the yaw axis.

The structure of the invention may comprise any of various subcombinations of the rocket motor nozzle assembly that is utilized to conserve motive fluid and reduces hunting of the space vehicle, such as are shown, for instance, in Figs. 3 and 5–9.

In Fig. 3 a single control nozzle is shown that has a needle valve portion 10 that is slightly ogival in shape, but which could be conical or frusto-conical. Needle valve part 10 is fixed to and actuated by rod 11, which is reciprocable by means of rack 12, pinion 13, and shaft 14, said shaft 14 being rotatable by a reversible correction motor of the type shown at 2 in Fig. 4, with which there may be utilized reduction gearing, such as is shown at 15 in Fig. 4. Valve-actuating rod 11 has bearings at 16 and 17. Although bearing 16 is shown to be integral with its support 16A, a separate bearing sleeve or set of antifriction bearings obviously may be utilized. Bearing 16 and bearing support 16A are shown as made from one block of metal. This block is drilled through to form a plurality of holes 20, of which only two are shown in cross-sectional Figure 3. Nozzle 19 is bolted to support 16A, against washer 18. This nozzle has conical convergent portion 19A and divergent portion 21. The throat of the nozzle, which constitutes also a valve seat, may or may not have an O-ring or other common type of seal on its inner surface, such as is shown, for example, in Fig. 8.

As shown in Fig. 3, this surface is in contact with the cylindrical part of rod 11; the throat of the valve, which is also the throat of nozzle 21, is closed. When the valve is actuated, due to attitude-correcting operation of the valve-controlling motor, the needle valve portion 10 is moved to the left in Fig. 3, thus opening the valve and allowing air or other motive fluid to move from port 23 through the gas distributor and out of rocket motor nozzle 21 in a thrust-producing jet. O-ring seals 22 prevent loss of the fluid at joints of the rocket motor. The ogival shape of needle portion 10 causes the valve to be opened only a slight amount when needle 10 is slightly moved to the left, due to a slow or short-duration departure of the space vehicle from a desired attitude, whereas for a rapid or long-period departure the ogival needle is moved further to the left, increasing the supply of motive fluid and the corrective thrust at a faster rate the further the needle is moved.

In each of Figs. 5, 6 and 8, two control nozzles that are interconnected by a valve-actuating, rack-comprising rod are shown. In Fig. 5, the needle valve parts have long, frusto-conical surfaces 23, each terminating in a slightly blunt point that in its valve-closed position is approximately in the plane of the nozzle mount or outlet 24. Element 25 is a cap, which may be of plastic or metal, that is used to protect the interior of the rocket motor until just prior to the time of its use. Fig. 6 is similar to Fig. 5, but shows the frusto-conical needle as terminating a considerable distance from the outlet of the nozzle. Fig. 8 shows a pair of needle valve portions that have ogival surfaces 24 that cooperate with outwardly flaring inner surfaces 25 of the pair of convergent-divergent nozzles, said inner surfaces, in longitudinal cross section, being curved to provide an increasingly steep angle of flaring from the throat to the outlet of the nozzle. In Fig. 8 an O-ring seal 35 is shown. Such a seal (or any other known type of annular seal) at the valve seat or nozzle throat obviously could be utilized in any of the nozzle assemblies shown in the other figures.

In the operation of the above-described embodiment of a pair of nozzles interconnected and controlled by a rack and pinion, when correction motor 2 opens one of the nozzles, by withdrawing the cylindrical portion of the needle from the nozzle's valve seat, it maintains the valve of the other nozzle closed due to sliding contact of the inner, annular surface of its valve seat with the cylindrical portion of its needle.

Figs. 7 and 9 show a second embodiment of the means for controlling a pair of interconnected nozzles. In Fig. 7 the needle portion of the nozzle valve has a short, conical surface 26, whereas in Fig. 9 the needle has a short, ogival surface 27. In both Figs. 7 and 9, when the correction motor is actuated it rotates shaft 28, thereby pivoting lever 29. Lever 29 has a slot 30, the end surfaces of which engage pins 31 and 32. When the lever is pivoted, for example in a counterclockwise direction in Fig. 7, the left-hand end of slot 30 moves pin 31, which is fixed to the left-hand valve-actuating rod, and thereby withdraws needle surface 26 from the left-hand valve seat, against the action of centering spring 33 that is located between the pair of valve-actuating rods. The opening of the valve allows a jet of motive fluid to be ejected through the left-hand nozzle. The amount and thrust of this motive fluid per unit of time directly varies with the extent of movement of pin 31 to the right; and this extent varies with the duration of the operation of correction motor 2.

While the left-hand nozzle valve is thus opened, the right-hand conical needle portion remains seated on its valve seat due to the force of spring 33 against the end 34 of the right-hand valve-actuating rod.

When the correction motor pivots lever 29 in a clockwise direction, the right-hand valve is opened and the left-hand valve remains closed.

The ogival shape of the valve needle and the curved inner surface of the nozzle provide for a corrective thrust that varies with an increasing increment per unit of time of the operation of correction motor 2.

Within the scope of the appended claims, the invention comprehends various obvious changes in the specific structure herein illustrated.

The following invention is claimed:

1. In a space vehicle for use outside the earth's atmosphere, having a nose portion and an after portion: four sets of attitude-correcting gaseous reaction motors, mounted on the outer periphery of said after portion, each set comprising a pair of juxtaposed, oppositely directed nozzles having a common axis that is tangent to a circle centered at the longitudinal axis of the vehicle, the four centers of said common axes being equally spaced about said circle, whereby the discharge of gas in the same direction from two parallel nozzles turns said vehicle about its pitch axis, the discharge of gas in the same direction from two other parallel nozzles turns the vehicle about its roll axis, and the discharge of gas in opposite directions thru parallel nozzles rolls the vehicle about said longitudinal axis; a valve for controlling the supply of gaseous motive fluid to each of said reaction motors; means for supplying gaseous motive fluid to said valves; actuating means for opening or closing said valves; each of said reaction motors comprising a nozzle having a throat and an outlet for the ejection of fluid from said vehicle; each of said valves comprising an element that is constructed and arranged relative to its associated nozzle to coact therewith for supplying to said outlet an amount of said motive fluid that increases with increase in the extent of opening of said valve by said actuating means; attitude sensing means for supplying a signal on deviation of the space vehicle from any of the desired attitudes relative to said axes; and means for connecting said sensing means with said actuating means, whereby when a signal results from a deviation of the vehicle relative to one of said axes a pair of said actuating means and their associated reaction motors are set in operation, to correct the vehicle's attitude.

2. In a space vehicle having a nose portion and an after portion, a thrust-producing assembly for controlling a space vehicle comprising: means for supplying gaseous motive fluid; two sets of attitude-correcting gaseous reaction motors, each set comprising a pair of juxtaposed, oppositely directed nozzles mounted on the outer periphery of said after portion, having a common axis that is tangent to a circle centered on the longitudinal axis of the vehicle, whereby discharge of gas from one of said nozzles changes the attitude of said vehicle in one direction, and discharge of gas from the other of said nozzles changes the attitude of said vehicle in the opposite direction, each of said nozzles having a throat and a flared outlet portion that increases in diameter from said throat to the outlet of the nozzle; valve means for controlling the supply of said fluid to said nozzles, comprising a pair of reciprocable valve elements, each of said elements having a portion that is movable to a position within a surrounding part of one of said nozzles and that has a cross-sectional circumference substantially equal to the cross-sectional circumference of said surrounding part, thereby closing the nozzle when the cross-sectional circumferences are in register, each of said elements further having another portion, within said flared outlet portion of its associated nozzle, that has a tapering surface, with a taper that decreases in diameter toward said nozzle outlet; and means for reciprocating said elements; said elements and last-named means being constructed and arranged for the closing of one of said nozzles by one of said elements while the other of said elements is movable by said means for opening the other of said nozzles in varying amounts.

3. A device as set forth in claim 2, in which said means for actuating said valve elements comprises a rack connected to said elements, a pinion in engagement with said rack, and means for rotating said pinion.

4. A device as set forth in claim 2, in which said means for actuating said valve elements comprises a lever, means pivotally connecting said lever and elements, and means for pivoting said lever.

5. A device as set forth in claim 2, in which said first-named portion of each of said elements has a tapering surface.

6. A device as set forth in claim 2, in which each of said pairs of nozzles and valve elements comprises coacting, tapering surfaces, that interfit in sealing relationship when the valve means is closed against the ejection of motive fluid.

7. A device as set forth in claim 2, in which each of said tapering surfaces is ogival.

8. A device as set forth in claim 2, in which each of said tapering surfaces is conical.

9. A device as set forth in claim 5, in which said tapering surfaces are conical.

10. A thrust producing assembly for controlling a space vehicle, adapted for use outside the earth's atmosphere, comprising: means for supplying gaseous motive fluid; a reaction motor assembly comprising a pair of coaxial, oppositely directed nozzles that are flow-connected to said means for supplying motive fluid, each of said nozzles having a throat portion and a flared outlet portion that increases in diameter from said throat portion to the outlet; a pair of coaxial valves, one for controlling the supply of said fluid to each nozzle, each valve comprising a movable element having a portion that is shiftable to or from a position within its associated nozzle and that has a cross-sectional diameter substantially equal to the cross-sectional diameter of the surrounding portion of said associated nozzle, thereby closing said nozzle when the cross-sectional diameters are in register, and further having another portion that has a tapering surface that decreases in diameter from a point adjacent said throat portion to said nozzle outlet, whereby when said element is moved from a position wherein it closes said nozzle to a position wherein the nozzle is opened the flow of fluid via the valve to the nozzle is progressively increased with the extent of movement of said element; and means for controlling said valve means comprising a single reversible motor and means connecting said motor to each of said elements, said connecting means and valves being constructed and arranged, for opening one of said valves at a time, while the other valve remains closed.

11. A device as set forth in claim 10, which further comprises a pair of supports, in each of which one of said elements is mounted for reciprocating movement, said elements being movable relative to each other; and in which said means connecting said motor and elements comprises lost-motion means interconnecting said elements whereby when one of said elements is moved to open one of the valves the other element maintains the other valve in closed position.

12. A device as set forth in claim 11, in which said connecting means further comprises a lever and said lost-motion means comprises a slot in said lever and a pair of pins extending into the slot, one pin being connected to each valve element.

13. A device as set forth in claim 12, in which said lost-motion means further comprises a spring located between said pins and urging said pins toward the opposite ends of said slot.

References Cited in the file of this patent

UNITED STATES PATENTS

| | | |
|---|---|---|
| 1,838,354 | Bauer | Dec. 29, 1931 |
| 2,395,435 | Thompson et al. | Feb. 26, 1946 |
| 2,510,506 | Lindhagen et al. | June 6, 1950 |
| 2,613,497 | MacDonald | Oct. 14, 1952 |
| 2,726,510 | Goddard | Dec. 13, 1955 |
| 2,780,914 | Ring | Feb. 12, 1957 |
| 2,822,755 | Edwards et al. | Feb. 11, 1958 |

FOREIGN PATENTS

| | | |
|---|---|---|
| 50,033 | France | Aug. 1, 1939 |